United States Patent
Tobin et al.

(10) Patent No.: US 12,373,500 B2
(45) Date of Patent: Jul. 29, 2025

(54) EXTRACTING CONTENT FROM A RESOURCE FOR RESTRUCTURING BASED ON USER INSTRUCTION

(71) Applicant: Microsoft Technology Licensing, LLC, Redmond, WA (US)

(72) Inventors: Jack David Tobin, Maynooth (IE); Andre Michael McQuaid, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 30 days.

(21) Appl. No.: 18/460,765

(22) Filed: Sep. 5, 2023

(65) Prior Publication Data

US 2025/0077590 A1    Mar. 6, 2025

(51) Int. Cl.
| | | |
|---|---|---|
| *G06F 16/951* | (2019.01) | |
| *G06F 16/953* | (2019.01) | |
| *G06F 16/9538* | (2019.01) | |
| *G06F 16/955* | (2019.01) | |

(52) U.S. Cl.
CPC ........ *G06F 16/951* (2019.01); *G06F 16/9566* (2019.01)

(58) Field of Classification Search
None
See application file for complete search history.

(56) References Cited

U.S. PATENT DOCUMENTS

| | | | |
|---|---|---|---|
| 10,922,493 B1* | 2/2021 | Das | G06F 40/30 |
| 2021/0240826 A1* | 8/2021 | Kutt | G06N 20/00 |
| 2022/0222584 A1* | 7/2022 | Nimmagadda | G06N 20/00 |
| 2023/0126826 A1* | 4/2023 | Meng | G06N 7/01 |
| | | | 704/9 |

OTHER PUBLICATIONS

Wenhao Yu; A survey of knowledge-enhanced text generation; ACM; 2022; pp. 1-38.*

* cited by examiner

*Primary Examiner* — Ann J Lo
*Assistant Examiner* — Jermaine A Mincey
(74) *Attorney, Agent, or Firm* — NovoTechIP International PLLC (57) ABSTRACT

A data processing system for providing a service to extract information from a resource includes: a network interface for communicating over a computer network; a scraper tool to receive user instruction specifying a target resource and to extract content from the specified resource, wherein the user instruction further specifies a desired restructuring of the extracted content; and a prompt generator to structure the extracted content into a prompt for an Artificial Intelligence (AI) model, the prompt further directing the AI model to restructure the extracted content based on the user instruction. The prompt generator is to call the AI model with the generated prompt. The service is to receive restructured content from the AI model and provide the restructured content to a workstation submitting the user instruction, the restructured content presenting the content of the target resource in a form according to the user instruction.

18 Claims, 8 Drawing Sheets

EXTRACTING CONTENT FROM A RESOURCE FOR RESTRUCTURING BASED ON USER INSTRUCTION

BACKGROUND

Vast amounts of information are stored on the Internet in the form of individual webpages. Each webpage is identified by a particular Uniform Resource Locator (URL). The URL can be entered into a browser to access the corresponding webpage and its information or content. Webpages can be merely informative or can be interactive, allowing the user to enter information and receive a response in order to accomplish a wide variety of tasks.

While providing virtually any type of information desired, the format or structure of the data available at a URL can present a technical problem in that the data is not easily extracted or converted into a desired format or organization. Consequently, the user may have to read through the webpage, collect the relevant information and reorganize the information to suit the user's purpose.

SUMMARY

In one general aspect, the instant disclosure presents a data processing system for providing a service to extract information from a resource. The data processing system includes: a network interface for communicating over a computer network; a scraper tool to receive user instruction specifying a target resource and to extract content from the specified resource, wherein the user instruction further specifies a desired restructuring of the extracted content; and a prompt generator to structure the extracted content into a prompt for an Artificial Intelligence (AI) model, the prompt further directing the AI model to restructure the extracted content based on the user instruction. The prompt generator is to call the AI model with the generated prompt. The service is to receive restructured content from the AI model and provide the restructured content to a workstation submitting the user instruction, the restructured content presenting the content of the target resource in a form according to the user instruction.

A method of extracting content from an online site for restructuring based on user instruction includes: with a scraper tool, receiving the user instruction specifying the site and extracting content from the specified site over a computer network, wherein the user instruction further specifies a desired restructuring of the extracted content; with a prompt generator, structuring the extracted content into a prompt for an Artificial Intelligence (AI) model, the prompt further comprising direction for the AI model to restructure the extracted content based on the user instruction; with the prompt generator, calling the AI model with the generated prompt; receiving restructured content from the AI model; and providing the restructured content to a workstation submitting the user instruction, the restructured content presenting the content of the specified site in a form according to the user instruction.

A non-transitory computer readable medium stores programming for a data processing system, the programming when executed by a processor, alone or in connection with other processors, providing a service. The service comprises: with a scraper tool, receiving the user instruction specifying the site and extracting content from the specified site over a computer network, wherein the user instruction further specifies a desired restructuring of the extracted content; with a prompt generator, structuring the extracted content into a prompt for an Artificial Intelligence (AI) model, the prompt further comprising direction for the AI model to restructure the extracted content based on the user instruction; with the prompt generator, calling the AI model with the generated prompt; receiving restructured content from the AI model; and providing the restructured content to a workstation submitting the user instruction, the restructured content presenting the content of the specified site in a form according to the user instruction.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

As noted above, the information stored at a particular URL or webpage may be useful in a variety of different contexts. The user may simply want to read the information available. Alternatively, the user may want the information for a particular purpose such as in a document form that can be shared.

For example, a potential client may want a summary of the structure or services of a company. For a user trying to respond to that potential client, all the information that the potential client wants may be available at the website of the company. However, the specific information the potential client wants may not be concisely organized at the website. It may be spread over several different webpages and may not be in a format that will be readily accessible to the potential client. It may also be mixed with other information that is not of interest to the potential client.

In a similar example, a user may want to prepare a proposal for a potential client. The website of that potential client may include a wealth of information about the potential client that could be helpful in formulating the proposal. Again, the information is available but is not in a format that will be readily useable to prepare the proposal.

Thus, in these and many other examples, the format or structure of the data at the URL may present the user with a technical problem in that the data is not easily converted into another format or organization for a variety of needs. Consequently, in each case, the user may have to read through the webpage, collect the relevant information and draft a new document or documents that suit the user's purpose. Thus, the technical problem that this description addresses is how to extract meaningful information from a website and use it to personalize an experience or to fill in documents with information from online sources. For example, a user may want to create a resume based on their LinkedIn profile, or a business may want to generate a customized proposal based on a client's website.

The described technical solution, in various examples, includes a web scraping tool to extract relevant information from a website and leverages Large Language Models (LLMs) to generate natural language text based on the extracted information. The solution may also use K-Means clustering to summarize very large documents and to pass the summary to an LLM for further processing.

Figure 1:
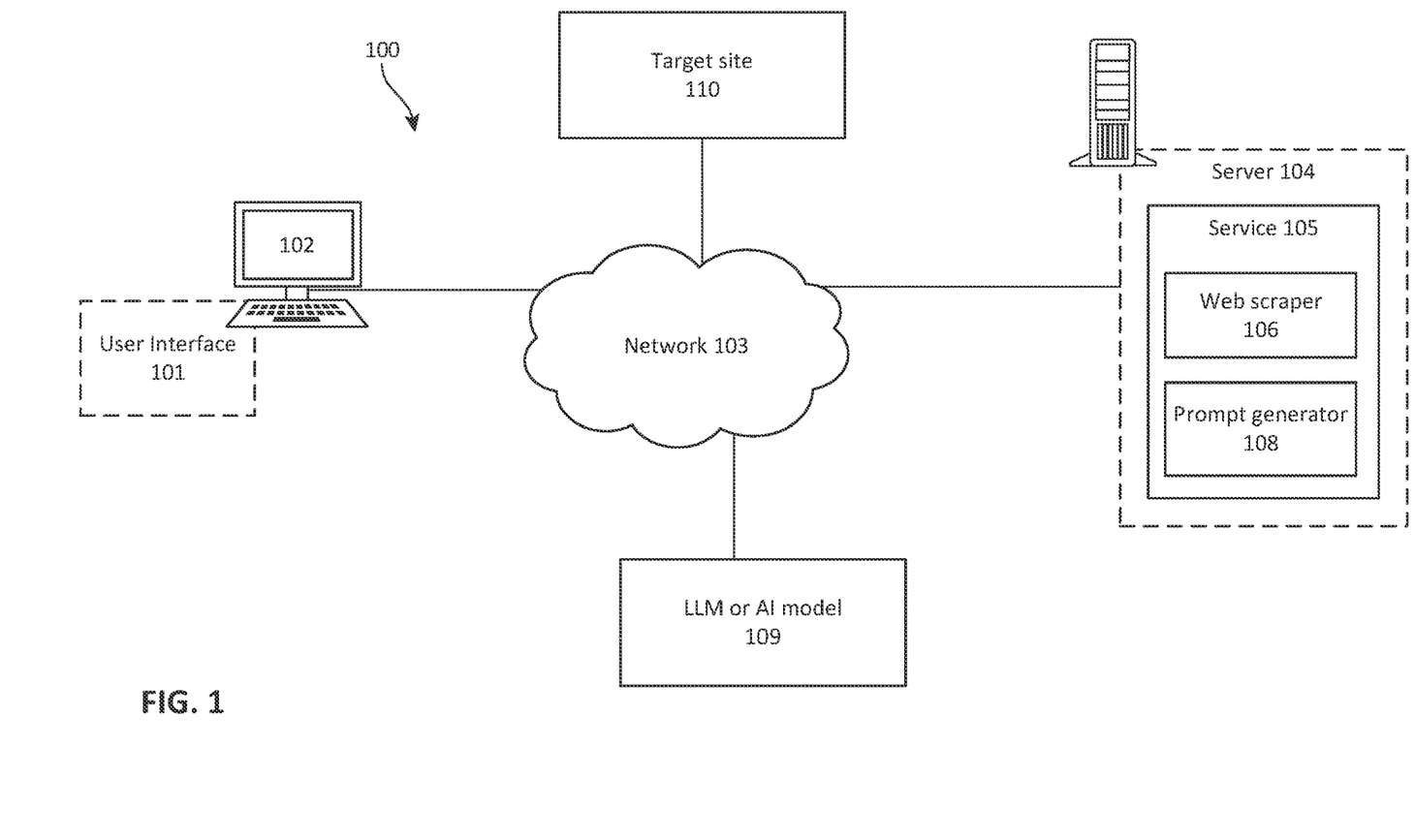
FIG. 1 depicts an example system in which aspects of this disclosure may be implemented.

FIG. 1 depicts an example system in which aspects of this description may be implemented. As shown in FIG. 1, an example of the system includes a user workstation 102 with a user interface 101. The user workstation may be, for example, a laptop, desktop, tablet, smart phone, thin client or other computer. The software architecture of FIG. 7 and the computer system of FIG. 8 may be used to implement the user workstation 102.

The workstation 102 includes a network interface to communicate via the network 103. The network 103 may be the internet, but may also be a wide area, local area or any other computer network. Where the network 103 is the Internet, sites on the network are identified by a URL, such as the target site 110. As used herein, the term "URL" and similar terms will be used to refer generally to any address by which a particular site on a computer network is accessed.

Consistent with the use examples given above, a user of the workstation 102 may need the information and content from the target site 110, but in a different format or organization than that in which the information is structured at the site 110. For example, the user may need to fill out a form for which all the needed information is recorded at the target site 110. As explained above, this presents a technical problem for the user in that the information from the site 110 is not structured to complete the form. Thus, the user must retrieve the information from the target site 110 and complete the form manually.

However, system 100 of FIG. 1 provides a technical solution to this technical problem. With system 100 of FIG. 1, the user is able to access a service 105 supported by a data processing system 104, for example, a server or data center, via the network 103 to solve this technical problem. In FIG. 1, the service 105 is depicted as a cloud service. Alternatively, the service 105, and its components, could be local to the workstation 102. The operation and details of the service 105 will be described below.

As shown in FIG. 1, the service 105 includes a web scraping tool or web scraper 106. The web scraper 106 is an application that uses a URL or other address for a target site, e.g., target site 110, to retrieve the content stored at the site and extract the information from the site so that the information can be restructured, reformatted, summarized or otherwise manipulated to suit the needs of the user. This may include the web scraper 106 using field or other metadata to identify the type of information available and extracted from the target site 110.

The service 105 also includes a prompt generator 108. The prompt generator 108 is a program or application module that takes the information scraped from the target site 110 by the web scraper 106 and structures that information into a prompt for a Large Language Model (LLM) or other Artificial Intelligence (AI) model 109. This prompt may be formulated to include instructions in natural language and will inform the model as to how to operate on the content from the target site so as to produce an output that suits the needs of a user, for example, in natural language text or narrative form. The prompt generator may use standard commands or commands based on the user instructions to provide the instructions of the prompt.

A Language Model (LM) is a type of artificial intelligence system designed to understand and generate human language. Specifically, a Large Language Model (LLM) refers to a powerful and advanced version of such models, capable of processing and generating complex language patterns and textual content. LLMs are built using machine learning techniques, often utilizing neural networks, and they can perform a wide range of language-related tasks. For example, LLMs can be used for: Text Generation: LLMs can generate coherent and contextually relevant text. They are capable of producing anything from short sentences to long articles, stories, and more. Text Completion: Given a partial sentence or text, an LLM can predict and complete the missing parts, making it useful for autocomplete suggestions and predictive typing. Language Translation: LLMs can translate text from one language to another, providing multilingual communication support. Text Summarization: LLMs can analyze a long piece of text and generate concise and coherent summaries, capturing the main points. Sentiment Analysis: These models can determine the emotional tone of a given text, classifying it as positive, negative, or neutral. Question Answering: LLMs can answer questions based on a given context, utilizing the information contained within the provided text. Language Understanding: LLMs can comprehend and process natural language instructions, enabling them to perform specific tasks based on user input. Chatbot Interaction: LLMs can engage in natural language conversations with users, simulating human-like interactions.

LLMs are a type of Artificial Intelligence (AI) model. Typically, LLMs use text as input and provide text as output. Extending LLMs to process image inputs as well as text is a natural progression and has already been explored to some extent with multimodal models. These models combine the capabilities of LLMs with those of Convolutional Neural Networks (CNNs), which are well-suited for processing visual data like images. In these multimodal models, the architecture would be adapted to accommodate both textual and visual data, with different components of the network handling each type of input. This opens up possibilities for more immersive and versatile AI applications, where the model can understand and generate content that blends both textual and visual information.

In the example of FIG. 1, the model 109 could be an LLM or other type of AI model, such as a model configured to except both text and image inputs. With multimodal input, the model 109 may be able to ingest both text and images from the target site 110 to generate more complete or multimodal output in a form needed and specified by the user.

Depending on the type of model 109 used, the prompt generator 108 will structure a prompt using the information obtained by the web scraper 106 from the target site 110. The prompt will cause the LLM/AI model 109 to utilize that information and output a response that is in the form or format needed by the user.

Figure 2:
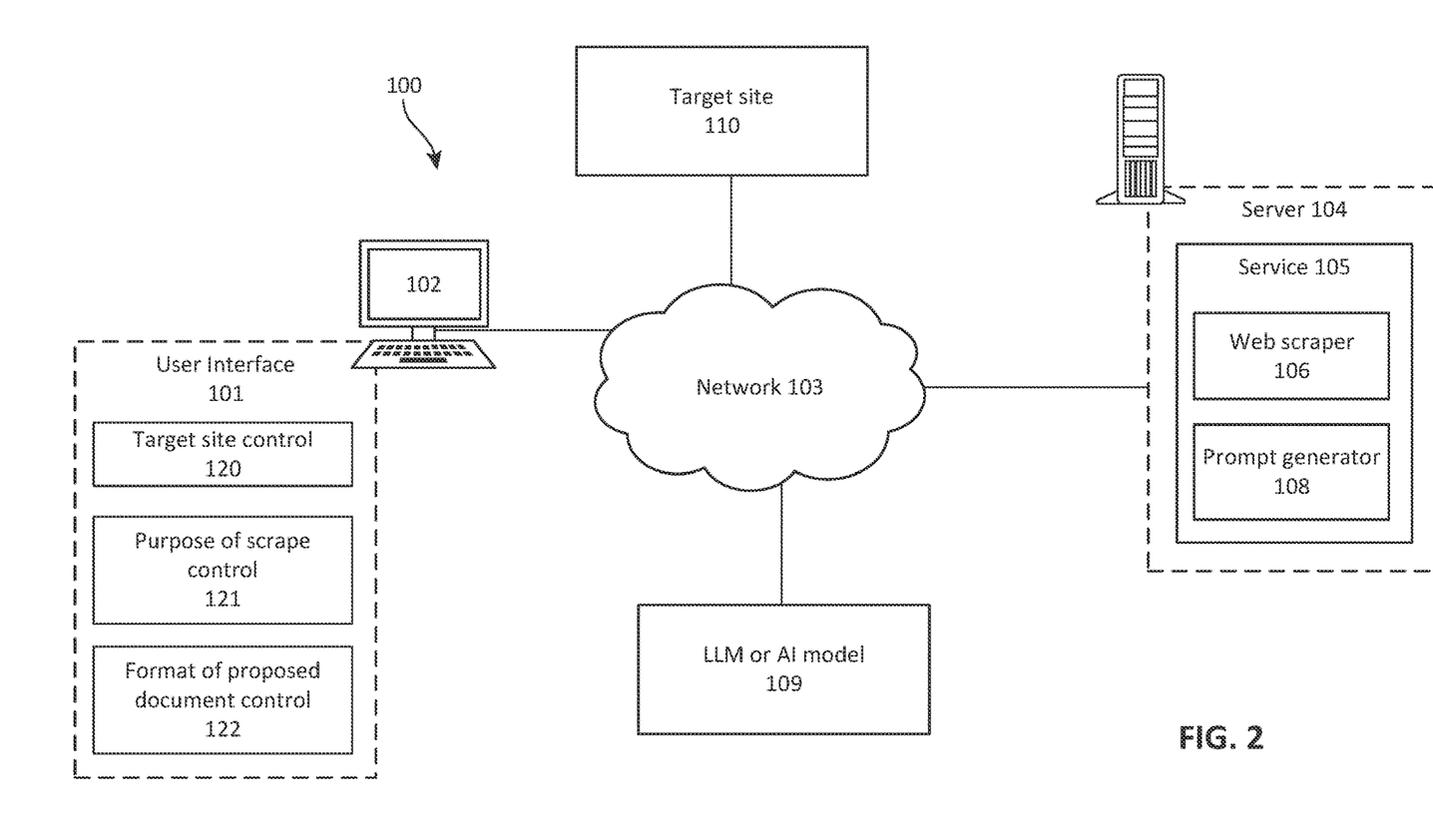
FIG. 2 depicts additional details of the user interface illustrated in FIG. 1.

FIG. 2 depicts additional details of the user interface illustrated in FIG. 1. As shown in FIG. 2, this example of the user interface 101 will first include a target site control 120. The target site control 120 could be an input field in which the user provides the URL or other identification of the target site 110 to be accessed and scrapped for content. The user may type or paste the URL into the target site control 120. In other examples, the target site control 120 could provide a list of potential target sites based on search criteria and accept the user's selection of a desired target site or sites.

Next the user interface 101 can include a control 121 for indicating the purpose for accessing the content of the target site 110, i.e., the purpose of scrapping the site. This control 121 could be a text input field, a drop-down menu, or any other type of control device. For example, the user may utilize this control 121 to specify that the purpose of accessing the target site 110 is to create a resume, prepare a proposal for a prospective client, summarize the target site, map the target site, generate additional content for the target site or any other example.

Lastly, the user interface 101 can include a control 122 for specifying the format of a proposed document generated by the AI model 109 or the service 105. Again, this control 122 could be a text input field, a drop-down menu, or any other type of control device. For example, the user could specify, using the control 122, that a particular form is to be completed using the information from the target site 110. The control 122 may allow the user to attach a file or input an address to a file for the particular form to be completed. The control 122 may also be used to specify that a proposed document be a spreadsheet, a word processing document, a resume, or use a particular template. The control 122 may allow the user to attach a file or input an address to a file for a template that is to be completed using content from the target site 110.

Figure 3:
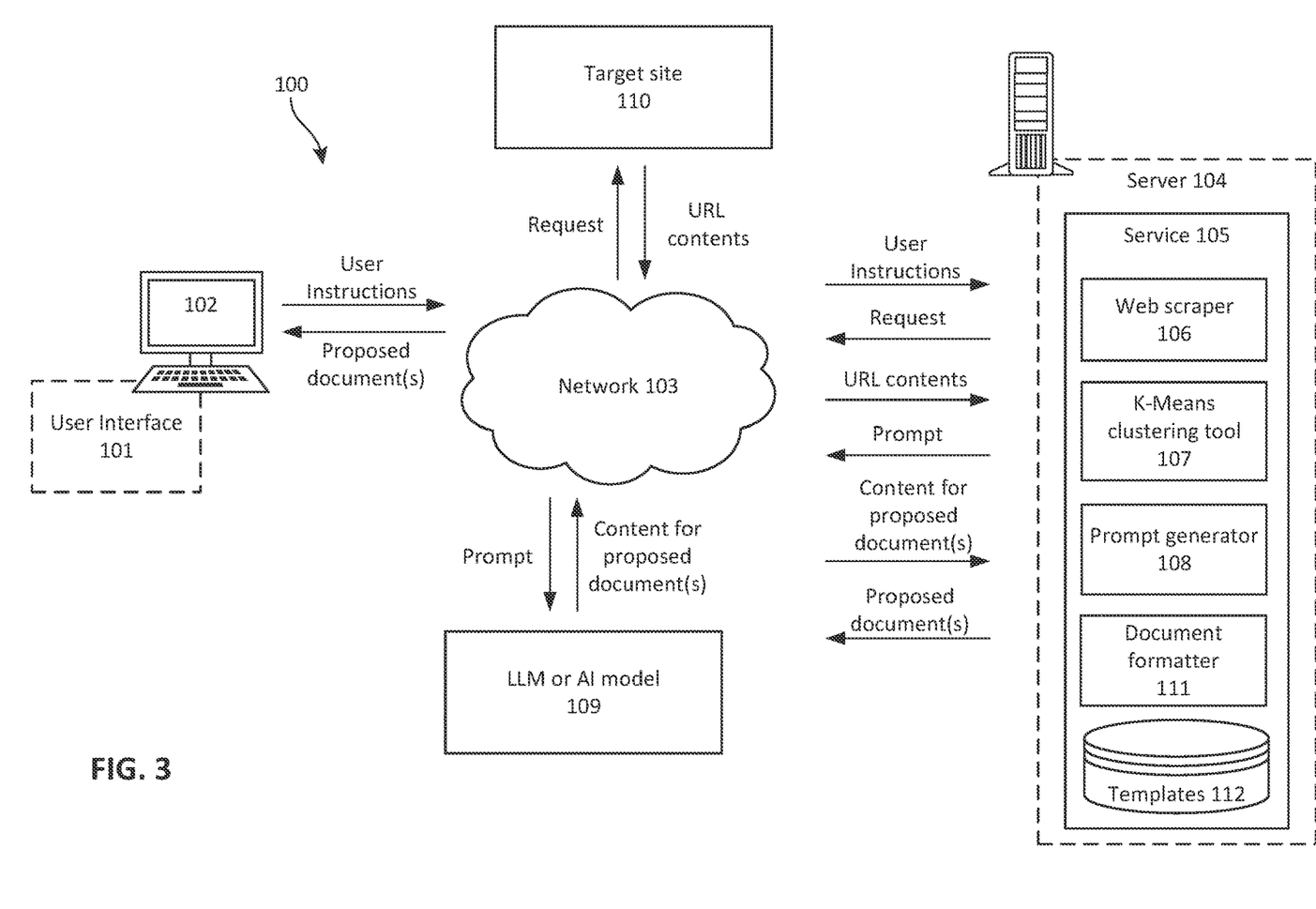
FIG. 3 depicts an illustrative workflow for the system of FIG. 1.

FIG. 3 depicts an illustrative workflow for the system of FIG. 1. As shown in FIG. 3, the flow begins with the user instructions being sent, via the network 103 to the service 105. As in FIG. 2, these user instructions may specify the target site 110 and how to access the target site, for example by a URL or other address. The user instructions may also specify the purpose of accessing the target site 110 and the format for a proposed document or documents to be generated based on the information from the target site 110. The user instructions may include a file or input an address to a file that is to be used in returning a proposed document or documents to the user.

The service 105 receives these user instructions. The web scraper 106 then sends a request for information and content from the target site 110. The target site 110 receives the request and returns the requested content, e.g., the URL contents, to the service 105.

In some examples, the amount of content from the target site 110 may be relatively large. If the content retrieved from the target site exceeds a threshold size, it may be difficult to present the content as input to the LLM or AI model 109. The LLM or AI model may have limits on the volume of data that can be included in a single input. In such instances, the service 105 can include and utilize a K-means clustering tool 107. Clustering is a technique to combine instances of similar information from a large body of data into clusters so that the content of the whole data set, e.g., a document or website, is represented by the key data from each cluster rather than the entire dataset. Thus, the clustering described herein is effective to identify the most relevant information, using a clustering algorithm, to better handle very large document summarization by grouping similar content and selecting the most relevant content of the group to send to the LLM.

K-means clustering is a popular clustering technique implemented as an unsupervised machine learning algorithm used for partitioning a dataset into a set of distinct, non-overlapping groups or clusters. The goal of K-means clustering is to assign each data point to one of these clusters in a way that minimizes the variance within each cluster and maximizes the variance between different clusters.

A K-means clustering algorithm may perform the following steps:

Initialization: The algorithm begins by selecting the number of clusters, denoted as "k," that are to be created. This value is chosen by the user based on domain knowledge or by using techniques like the elbow method. The elbow method involves plotting the variance explained by the clusters against different values of k and looking for the "elbow point" where adding more clusters doesn't significantly reduce variance.

Centroid Initialization: The algorithm then randomly selects k data points from the dataset to serve as the initial centroids of the clusters. Each centroid represents the center of one of the clusters.

Assignment Step: For each data point in the dataset, the algorithm calculates the distance between the point and each of the centroids. The data point is assigned to the cluster whose centroid is closest to it in terms of distance. This step effectively assigns each data point to its nearest cluster.

Update Step: After all data points have been assigned to clusters, the algorithm updates the centroids of each cluster. The new centroid of a cluster is calculated as the mean of all data points currently assigned to that cluster. This step repositions the centroids based on the new assignments.

Iteration: The Assignment and Update steps are repeated iteratively until convergence is achieved. Convergence happens when the centroids no longer significantly change between iterations or when a predefined number of iterations is reached.

Result: Once the algorithm converges, the final set of clusters is determined. Each data point belongs to the cluster whose centroid it is closest to. The quality of the clusters obtained can depend on the initial choice of centroids. Sometimes, the algorithm can get stuck in local minima, leading to suboptimal clustering results. To mitigate this, K-means can be run multiple times with different initializations, and the best clustering result can be chosen based on a certain criterion (e.g., minimizing the sum of squared distances within clusters).

K-means clustering has a few limitations, such as sensitivity to the initial centroid placement, a reliance on the user-specified value of k, and difficulties with non-linear or irregularly shaped clusters. However, it is a relatively simple and computationally efficient method that works well for many real-world clustering tasks.

Thus, the service 105 will determine, based on size of the dataset, if the URL contents should be clustered by the K-means clustering tool 107 as part of the service to the user. If so, the K-means clustering tool 107 is executed on the URL contents.

The prompt generator 108 then operates on either the original URL contents or, if the K-means clustering tool was used, on dataset created from the clusters. In either case, the prompt generator operates to produce the prompt for the AI model 109, as described above. The prompt includes both content from the URL and instructions to the model 109 as to what to do with that content. The prompt will be in a format matching the requirements of the model 109 being used. Again, the model 109 may be an LLM, a multimodal AI model or other machine learning model.

As shown in FIG. 3, the prompt is then output via the network 103 from the service 105 to the LLM or AI model 109. The LLM or AI model 109 will then operate based on the instructions and structure of the prompt to restructure, reformat, reposition, reorganize, summarize, extend or otherwise utilize the URL content to produce content for a proposed document or documents needed by the user. This output may be in natural language form that collects or summarizes the content of the target site as needed by the user. The prompt can also cause the model 109 to extract the key or important points of the information or content from the target site while discarding content that is less significant. This may be important to render the content from the target site suitable for the user's purposes.

The contents for the proposed document or document are then provided back to the service 105. The service 105 includes a document formatter 111 that utilizes the proposed content from the AI model 109 to generate a proposed document or documents needed by the user. The document formatter 111 may have access to a template database 112 with different document templates that can be used.

For example, if the user needs to complete a particular form using the information from the target site, that form can be included with the user instructions, recorded in the template database 112, and then completed with the content from the AI model 109. As noted above other types of templates may be similarly provided with the user instructions and stored in the database 112 for use. Additionally or alternatively, the database 112 may have a collection of stock forms that can be accessed to meet the user's needs. The options in a collection of stock forms can be communicated from the service 105 to the user interface 101 and presented for selection in the control 122 for specifying the format of the proposed document(s) (FIG. 2).

In a specific example, the template database 112 may include a template for a resume that is completed with the information from the target site 110 as reconditioned by the AI model. 109. In this example, the target site 110 may be a social media or work profile site, such as LinkedIn, with the user's professional information. That information can then be collected by the service 105 from the target site, reconditioned or organized by the AI model 109 and input into a resume template by the document formatter 111. The database 112 may, for example, including a resume template for such instances.

In still another specific example, the template database may have or may be provided with a template for a project proposal for the type of work performed by the user. The user's preferred template may be sent with the user's instructions. The target site 110 may be the site of a potential client to whom the user would like to provide the proposal. The URL contents may include basic information about the potential client that is reconditioned by the AI model 109 and then placed in the proposal template by the document formatter 111.

Figure 4:
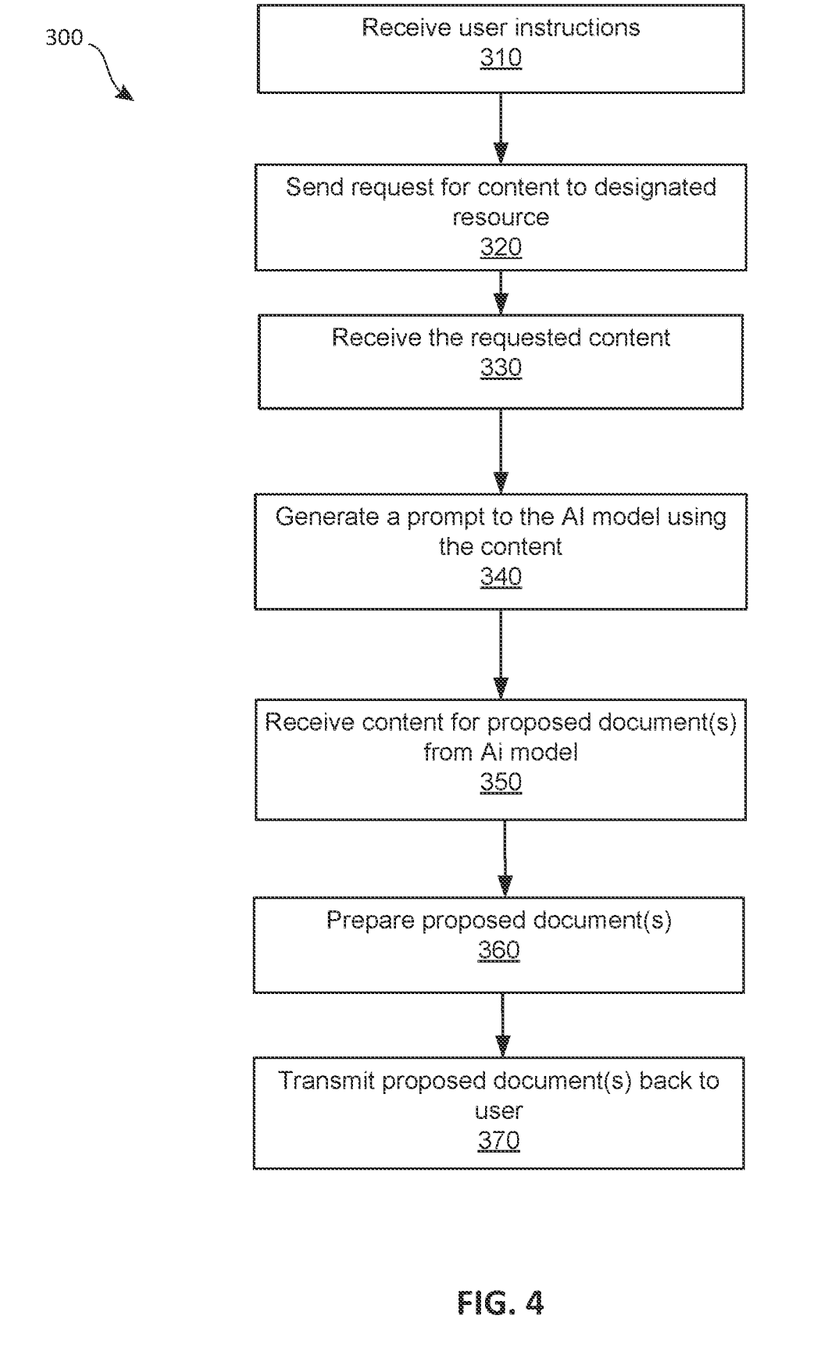
FIG. 4 is a flowchart illustrating the operation of the service depicted in FIGS. 1-3.

FIG. 4 is a flowchart illustrating the operation 300 of the service depicted in FIGS. 1-3. As shown in FIG. 4, the service first receives the user instructions 310. As noted above, the user instructions may contain all of an identification of the target site, the purpose for extracting information from the site and the format in which the user needs the output. This may include a template document to be completed for the user.

Next, the service sends a request to the designated resource, e.g., the target site, for the content 320. While described in terms of a URL, website or webpage, the target site can be any resource at which content is available for access by the service. The service will the receive the content 330 in response to the request.

The service will then generate a prompt to the AI model using the content and the instructions defining the intent of the user 340. The prompt generator is configured to effectively or optimally structure the content and the user instructions into a form that will be readily processable by the AI model. The generated prompt is then submitted to the AI model.

The service then receives, from the AI model, revised content suitable for the user's purposes 350. This could be simply a summary of the content from the target site or a structured rendering of the content from the target site suitable for use by the document formatter described above.

The service lastly prepares a proposed document or documents for the user with the content provided by the AI model 360. The service then transmits the resulting document(s) back to the requesting user 370. If the user is not satisfied with the document(s), the user can request that the service repeat the process, perhaps with revised user instructions that more specifically indicate what the user needs from the service.

Figure 5:
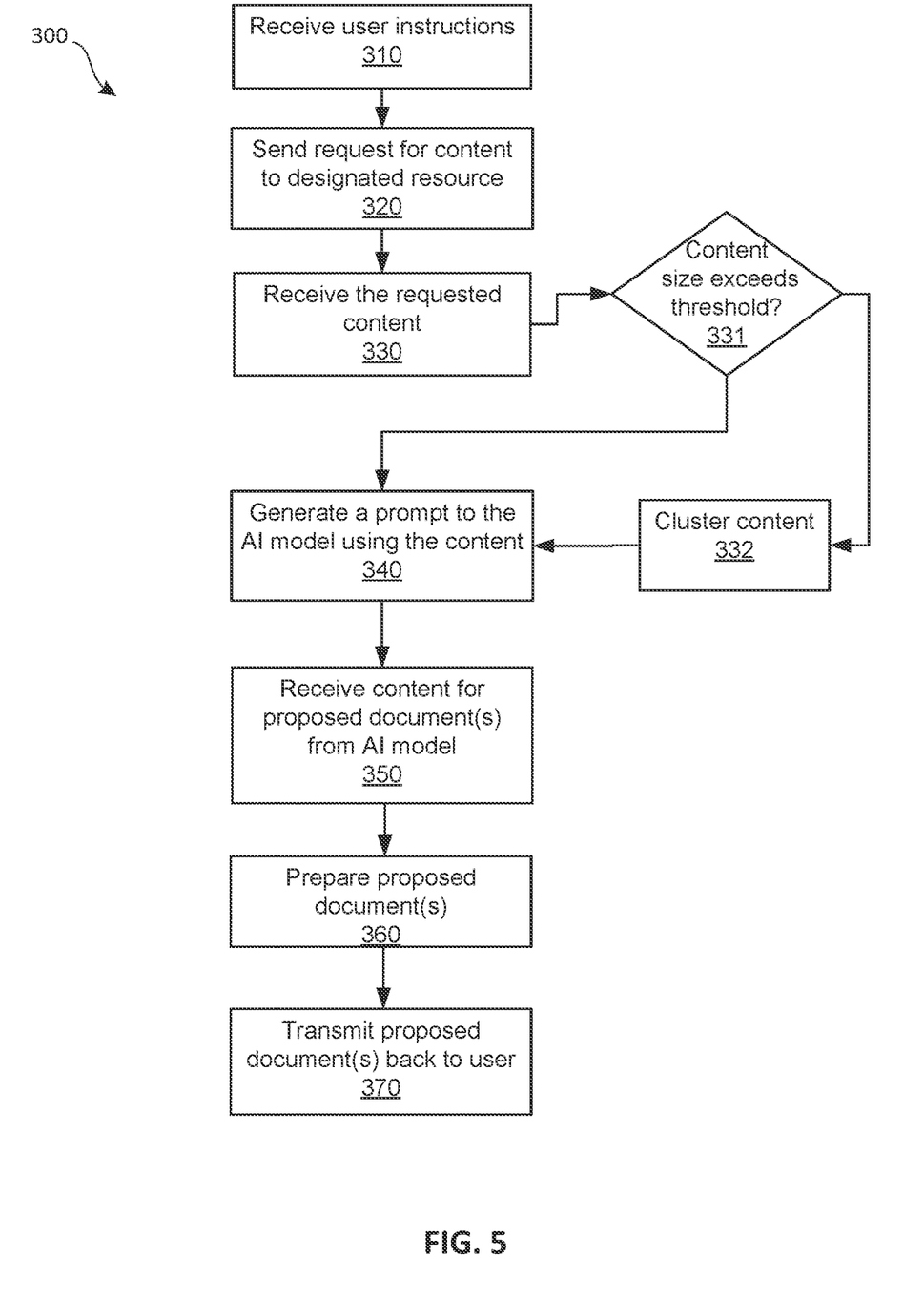
FIG. 5 is another flowchart illustrating additional possible details of the operation of the service depicted in FIGS. 1-3.

FIG. 5 is another flowchart illustrating additional possible details of the operation of the service depicted in FIGS. 1-3. However, as noted above, the volume of content from the target site may frequently be too large to utilize in a prompt to the AI model. In address such cases, as shown in FIG. 5, the service can receive the requested content from the target site 330 and then determine whether the volume of that content exceeds a threshold 331. This threshold can be specified in a number of measures, such as, tokens, bytes, words, etc.

If the content volume exceeds the threshold 331, the content can be clustered 332. As described above K-means clustering can be effectively used to represent the content from the target site in a smaller volume more suited to the prompt for the AI model. The service then proceeds with generating the prompt to the AI model using the clustered content 340. The remainder of the method is as described above in FIG. 4.

Figure 6:
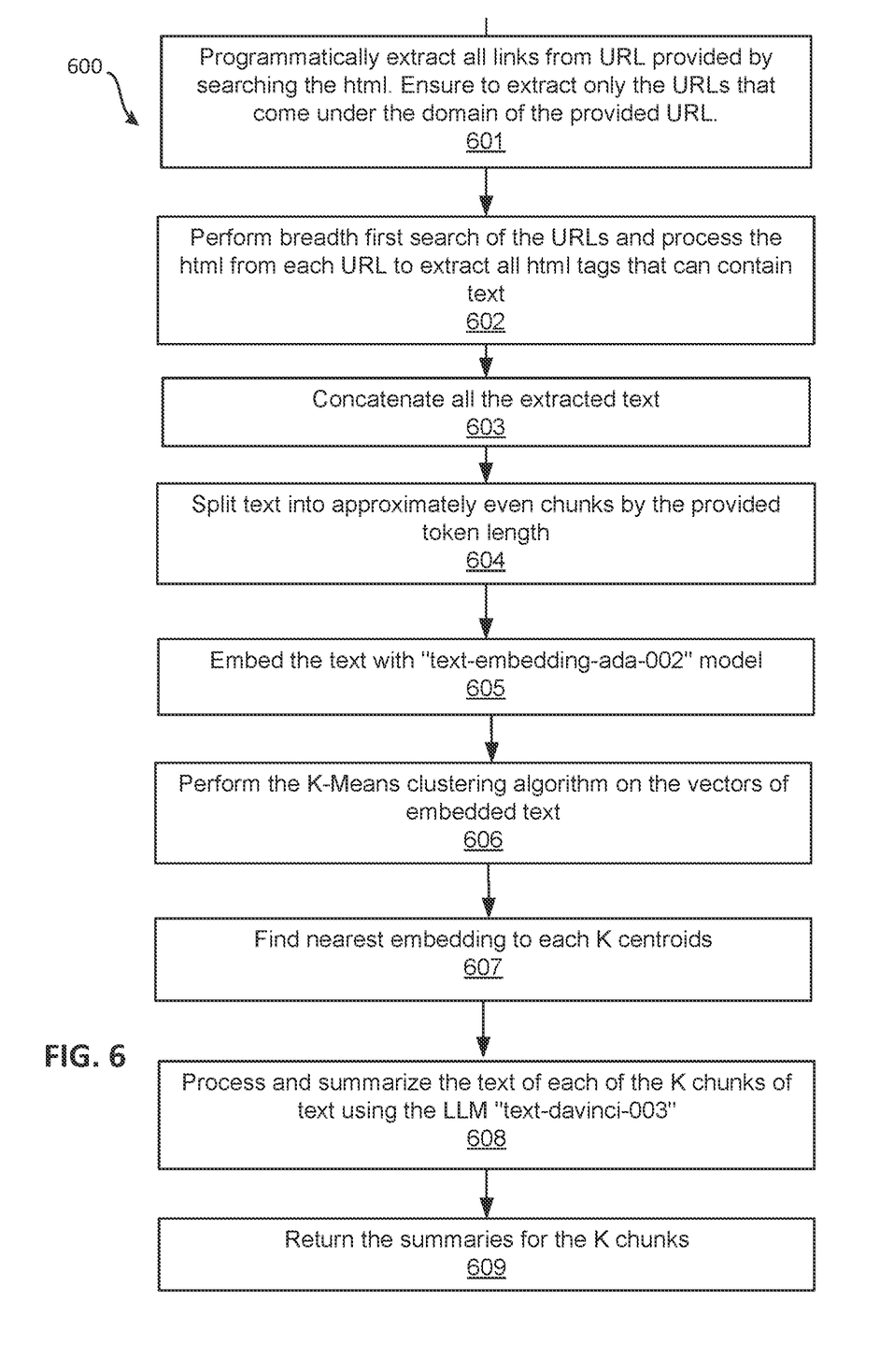
FIG. 6 is another flowchart illustrating the operation of an example of the scraper tool depicted in FIGS. 1-3.

FIG. 6 is another flowchart illustrating the operation 600 of an example of the scraper tool and other components depicted in FIGS. 1-3.

Usually, a webpage will have a hierarchical structure with a main page from which any number of other branching pages can be accessed. Each page may have its own URL under the domain of the main page. Appropriately scraping the content from this hierarchical structure presents a technical problem with the following technical solution. As shown in FIG. 6, this example of the scraper tool begins by programmatically extracting all links from URL provided by the user 601, i.e., the URL for the target site. This is done by searching the HyperText Markup Language (HTML) of the target site with care to extract only the branching URLs that come under the domain of the provided URL.

Next, the scraper tool performs a Breadth First Search (BFS) on the extracted URLs and processes the HTML from each URL to extract all the HTML tags that can contain text 602. A Breadth First Search (BFS) explores a graph level by level, visiting all neighbors before moving to the next level. It guarantees the shortest path and is suitable for unweighted graphs, connected components, and when memory efficiency is important. A Depth First Search (DFS), in contrast, explores a graph branch by branch, going as deep as possible before backtracking. BFS is preferred for finding the shortest path, working with unweighted graphs, identifying connected components, and when memory efficiency matters. DFS is useful for finding all paths, exploring all possibilities, and when the graph has a specific structure benefiting from depth-first exploration.

Next, the scraper tool will concatenate all the extracted text 603. Then, the scraper tool will split the text into approximately even chunks by the provided token length 604. The scraper tool will then embed the text with, for example, the "text-embedding-ada-002" model 605.

Text embedding refers to the process of representing text data in a numerical format that can be understood and processed by machine learning models. Embeddings capture the semantic and contextual information of words, phrases, or sentences in a dense vector representation. The text-embedding-ada-002 model is a specific embedding model developed by OpenAI.

To embed text using text-embedding-ada-002, the tool passes the input text to the embedding model. The embedding model returns a numerical vector representation, often with hundreds of dimensions. This embedding captures the underlying meaning and relationships between words and can be used as input to various downstream natural language processing tasks such as text classification, sentiment analysis, question answering, and language generation.

The text-embedding-ada-002 model has been trained on a large corpus of text data and has learned to encode contextual information, semantic similarities, and relationships between words and phrases. By leveraging such embeddings, machine learning models can effectively analyze and understand textual data, enabling a wide range of applications in language understanding and generation.

The scrapper tool will next call the K-Means clustering algorithm on the vectors of embedded text 606. As noted, K-Means clustering is an unsupervised machine learning algorithm used to group similar data points into clusters. It aims to partition a dataset into k distinct clusters, where each data point belongs to the cluster with the nearest mean (centroid) based on the distance metric used. The algorithm iteratively assigns data points to the nearest centroid and recalculates the centroids until convergence.

In K-Means clustering, the number of clusters, k, is predefined. Initially, k centroids are randomly chosen or placed at specific points in the dataset. Then, each data point is assigned to the nearest centroid based on a distance metric such as Euclidean distance. After all data points are assigned, the centroids are recalculated by computing the mean of the data points in each cluster. This process is repeated until convergence, where the centroids no longer change significantly or a maximum number of iterations is reached.

K-Means clustering is commonly used for tasks such as customer segmentation, image compression, document clustering, and anomaly detection. It is a simple and computationally efficient algorithm but is sensitive to the initial centroid placement and can converge to suboptimal solutions. To mitigate these issues, techniques like multiple initializations and selecting the optimal k using evaluation metrics can be employed.

The K-Means algorithm will find nearest embedding to each of a number of K centroids 607, e.g., Euclidean Distance. This results in a number of K chucks of text which can now be used by the prompt generator. The prompt generator will process and obtain a summary of the text of each of the K chunks using, for example, the LLM "text-davinci-003" 608.

As noted above, LLMs, or Language Models, are sophisticated artificial intelligence models designed to understand and generate human-like text based on vast amounts of training data. LLMs employ deep learning techniques, particularly Transformer architectures, to process and generate text. These models have revolutionized natural language processing tasks by exhibiting remarkable language understanding and generation capabilities.

LLMs are trained on massive datasets, such as books, articles, websites, and other sources, enabling them to learn grammar, context, and semantic relationships between words. They are capable of predicting the most probable next word in a sentence, completing prompts, answering questions, translating languages, summarizing text, and much more.

OpenAI's GPT-3 (Generative Pre-trained Transformer 3) and GPT 4 are examples of a powerful LLM. It has been trained on an extensive range of internet text and possesses the ability to generate coherent and contextually relevant responses given a prompt.

LLMs are versatile tools with significant implications across various fields, including content generation, virtual assistants, customer support, language translation, and creative writing assistance. Their ability to comprehend and produce human-like text contributes to their widespread adoption and application in numerous language-related tasks.

The LLM will then return the summaries for the K chunks 609. This may be the desired content to be utilized in the proposed document or documents for the user.

In summary, the system described here provides a technical solution to the technical problems described above with the following technical advantages. It enables the system to obtain relevant information from a website without manually browsing or searching the website. It enables the system to generate natural language text based on the extracted information, which can be used for various purposes, such as creating a resume, a proposal, or an onboarding message. It enables the system to manage very large documents by summarizing them and passing the summary to the LLM for further processing. It leverages the state-of-the-art LLMs that can generate high-quality and coherent natural language text based on the input data. It provides a user-friendly interface that allows the user to customize the web scraping and text generation process.

The system described also combines web scraping, clustering, text generation, and text summarization in one tool, which provides a more comprehensive and integrated solution for the user. It leverages LLMs that can analyze the extracted data and generate natural language text based on the data, which provides a more accurate and natural solution for the user. It uses K-Means clustering to summarize very large documents, which provides a more efficient and scalable solution for the user. This reduces the number of tokens that need to be processed by the LLM which reduces cost significantly whilst retaining the significant information. It provides a user interface that allows the user to customize the web scraping and text generation process, which provides a more flexible and personalized solution for the user.

Figure 7:
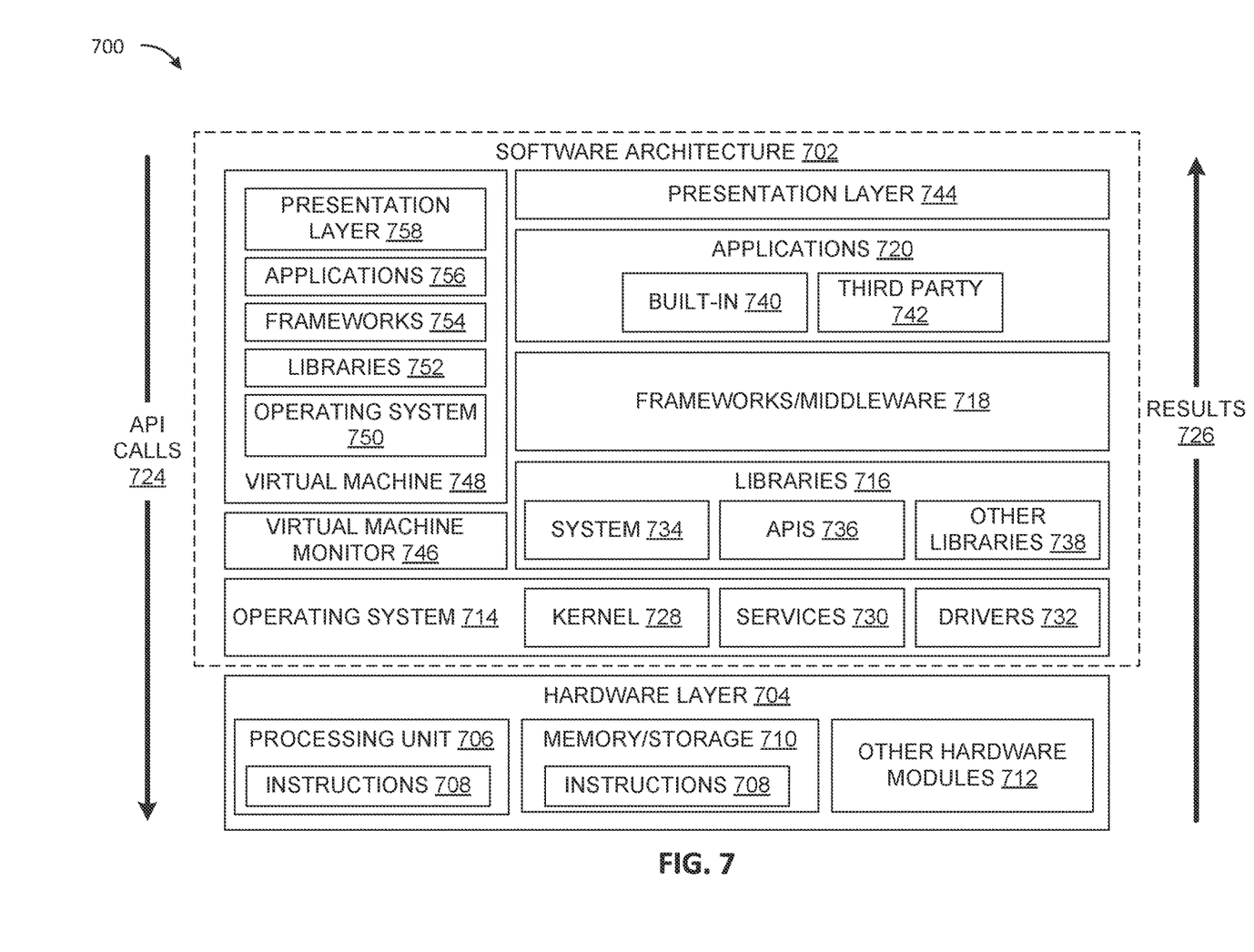
FIG. 7 is a block diagram illustrating an example software architecture, various portions of which may be used in conjunction with various hardware architectures herein described.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Uniform Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
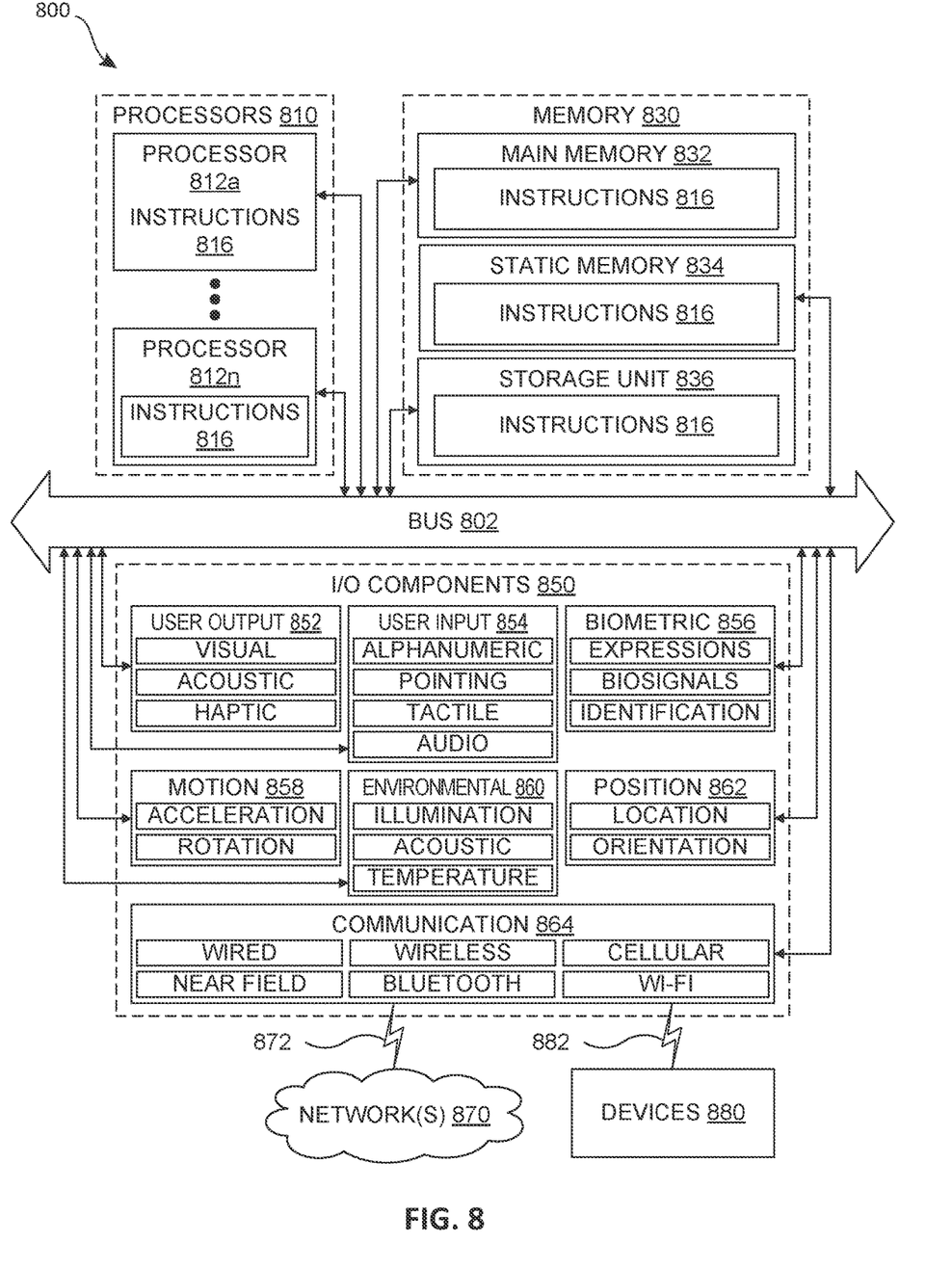
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed.

As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a data processing system machine or a client machine in a data processing system-client network environment, or as a node in a peer-to-peer or distributed network environment. Machine 800 may be embodied as, for example, a data processing system computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless data processing system or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864 such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system for providing a service to extract information from a resource comprising:
a network interface for communicating over a computer network;
a scraper tool to receive user instruction specifying a target resource and to extract content from the specified resource, wherein the user instruction further specifies a desired restructuring of the extracted content; and
a prompt generator to structure the extracted content into a prompt for an Artificial Intelligence (AI) model, the prompt further directing the AI model to restructure the extracted content based on the user instruction;
wherein the prompt generator is to call the AI model with the generated prompt; and
wherein the service is to receive restructured content from the AI model and provide the restructured content to a workstation submitting the user instruction, the restructured content presenting the content of the target resource in a form according to the user instruction.

Item 2. The data processing system of claim Item 1, wherein the service comprises a user interface presented at the workstation, the user interface comprising a control for specifying the target resource and specifying a format for the restructured content.

Item 3. The data processing system of claim Item 2, wherein the user interface further comprises a control for indicating a purpose for scraping the resource.

Item 4. The data processing system of claim Item 1, wherein the resource is a webpage specified by a Uniform Resource Locator (URL).

Item 5. The data processing system of claim Item 1, further comprising a K-means clustering tool for clustering the extracted content to be used by the prompt generator when a volume of the extracted content exceeds a threshold.

Item 6. The data processing system of claim Item 1, further comprising a document formatter tool to place the restructured content into a particular format within a proposed document to be sent to the workstation.

Item 7. The data processing system of claim Item 6, further comprising a template database comprising a number of template documents to be used by the document formatter to generate the proposed document.

Item 8. The data processing system of claim Item 6, wherein the user instruction comprises a document file for the document formatter to use when placing the restructured content to generate the proposed document.

Item 9. The data processing system of claim Item 1, wherein the scraper tool is programmed to:
programmatically extract all links from the target resource;
perform a breadth first search of the links; and
concatenate extracted text from the breadth first search.

Item 10. The data processing system of claim Item 9, wherein the target resource is a website specified by a Uniform Resource Locator (URL), the scarper tool to only extract links using a same domain as the URL and process HyperText Markup Language (HTML) from each link to extract all HTML tags that can contain text.

Item 11. The data processing system of claim Item 1, wherein the scraper tool is programmed to:
embed text in the extracted content; and
call a clustering tool to cluster the content based on vectors of the embedded text prior to generating the prompt.

Item 12. A method of extracting content from an online site for restructuring based on user instruction, the method comprising:
with a scraper tool, receiving the user instruction specifying the site and extracting content from the specified site over a computer network, wherein the user instruction further specifies a desired restructuring of the extracted content;

with a prompt generator, structuring the extracted content into a prompt for an Artificial Intelligence (AI) model, the prompt further comprising direction for the AI model to restructure the extracted content based on the user instruction;

with the prompt generator, calling the AI model with the generated prompt;

receiving restructured content from the AI model; and providing the restructured content to a workstation submitting the user instruction, the restructured content presenting the content of the specified site in a form according to the user instruction.

Item 13. The method of claim Item 12, further comprising presenting a user interface at the workstation, the user interface comprising a control for specifying the site and specifying a format for the restructured content.

Item 14. The method of claim Item 13, wherein the user interface further comprises a control for indicating a purpose for scraping the site.

Item 15. The method of claim Item 12, wherein the site is a website specified by a Uniform Resource Locator (URL).

Item 16. The method of claim Item 12, further comprising:

with a K-means clustering tool, clustering the extracted content; and using representative information based on the clustering of the content to generate the prompt.

Item 17. The method of claim Item 12, further comprising placing the restructured content into a particular format within a proposed document to be sent to the workstation.

Item 18. A non-transitory computer readable medium storing programming for a data processing system, the programming when executed by a processor, alone or in connection with other processors, providing a service comprising:

with a scraper tool, receiving user instruction specifying a site and extracting content from the specified site over a computer network, wherein the user instruction further specifies a desired restructuring of the extracted content;

with a prompt generator, structuring the extracted content into a prompt for an Artificial Intelligence (AI) model, the prompt further comprising direction for the AI model to restructure the extracted content based on the user instruction;

with the prompt generator, calling the AI model with the generated prompt;

receiving restructured content from the AI model; and providing the restructured content to a workstation submitting the user instruction, the restructured content presenting the content of the specified site in a form according to the user instruction.

Item 19. The computer readable medium of Item 18, wherein the scraper tool is programmed to:

programmatically extract all links from the specified site;

perform a breadth first search of the links; and concatenate extracted text from the links based on the breadth first search.

Item 20. The computer readable medium of Item 19, wherein the specified site is a website specified by a Uniform Resource Locator (URL), the scarper tool to only extract links using a same domain as the URL and process HyperText Markup Language (HTML) from each link to extract all HTML tags that can contain text.

In the foregoing detailed description, numerous specific details were set forth by way of examples in order to provide a thorough understanding of the relevant teachings. It will be apparent to persons of ordinary skill, upon reading the description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system for providing a service to extract information from a resource, the data processing system comprising:
   a processor; and
   a memory in communication with the processor, the memory comprising executable instructions that, when executed by the processor alone or in combination with other processors, cause the data processing system to perform functions of:
   receiving a user instruction by a web scraper, the user instruction including a target site of the resource and a user intent for scraping the target site, the web scraper extracting content from the target site, and determining whether a volume of the content exceeds a threshold, wherein:
      when the volume of the content exceeds the threshold, calling a clustering algorithm to produce summarized content, and
      when the volume of the content does not exceed the threshold, forming structured content with the web scraper by concatenating text extracted from the content, splitting the text into similar chunks according to a provided token length for a large language model, and embedding the text;
   generating a prompt by a prompt generator in a format matching a set of requirements of the large language model, the prompt including one of the structured content and the summarized content, and model instructions related to the user intent, the prompt generator providing the prompt to the large language model, wherein the prompt causes the large language model to operate on either the structured content or the summarized content according to the model instructions to produce output content;
   receiving the output content by a document formatter from the large language model, the document formatter producing a proposed document from the output content; and
   causing the proposed document to be displayed on a user interface of a device.

2. The data processing system of claim 1, wherein, the user interface includes a control for specifying the target site and a format for the proposed document.

3. The data processing system of claim 2, wherein the user interface further includes a control for indicating the user intent.

4. The data processing system of claim 1, wherein the resource is a webpage specified by a Uniform Resource Locator (URL).

5. The data processing system of claim 1, wherein the clustering algorithm further comprises a K-means clustering algorithm.

6. The data processing system of claim 1, further comprising a template database comprising a number of template documents to be used by the document formatter to generate the proposed document.

7. The data processing system of claim 1, wherein the user instruction comprises a document file for the document formatter to use when placing the output content to generate the proposed document.

8. The data processing system of claim 1, wherein the web scraper is programmed to:
   programmatically extract all links from the target site;
   perform a breadth first search of the links; and
   concatenate extracted text from the breadth first search.

9. The data processing system of claim 8, wherein the target site is a website specified by a Uniform Resource Locator (URL), the web scraper to only extract links using a same domain as the URL and process HyperText Markup Language (HTML) from each link to extract all HTML tags that can contain text.

10. A method of extracting content from an online site for restructuring based on user instruction, the method comprising:
   receiving a user instruction by a web scraper, the user instruction including a target site of a resource and a user intent for scraping the target site, the web scraper extracting content from the target site, and determining whether a volume of the content exceeds a threshold, wherein:
      when the volume of the content exceeds the threshold, calling a clustering algorithm to produce summarized content, and
      when the volume of the content does not exceed the threshold, forming structured content with the web scraper by concatenating text extracted from the content, splitting the text into similar chunks according to a provided token length for a large language model, and embedding the text;
   generating a prompt by a prompt generator in a format matching a set of requirements of the large language model, the prompt including one of the structured content and the summarized content, and model instructions related to the user intent, the prompt generator providing the prompt to the large language model, wherein the prompt causes the large language model to operate on either the structured content or the summarized content according to the model instructions to produce output content;
   receiving the output content by a document formatter from the large language model, the document formatter producing a proposed document from the output content; and
   causing the proposed document to be displayed on a user interface of a device.

11. The method of claim 10, further comprising presenting a user interface, the user interface including a control for specifying the target site and a format for the proposed document.

12. The method of claim 11, wherein the user interface further comprises a control for indicating the user intent.

13. The method of claim 10, wherein the target site is a website specified by a Uniform Resource Locator (URL).

14. The method of claim 10, wherein the clustering algorithm further comprises a K-means clustering algorithm.

15. The method of claim 10, further comprising placing restructured content into a particular format within the proposed document.

16. A non-transitory computer readable medium storing programming for a data processing system, the programming when executed by a processor, alone or in connection with other processors, providing a service comprising:
   receiving a user instruction by a web scraper, the user instruction including a target site of a resource and a user intent for scraping the target site, the web scraper extracting content from the target site, and determining whether a volume of the content exceeds a threshold, wherein:
      when the volume of the content exceeds the threshold, calling a clustering algorithm to produce summarized content, and
      when the volume of the content does not exceed the threshold, forming structured content with the web scraper by concatenating text extracted from the content, splitting the text into similar chunks according to a provided token length for a large language model, and embedding the text;
   generating a prompt by a prompt generator in a format matching a set of requirements of the large language model, the prompt including one of the structured content and the summarized content, and model instructions related to the user intent, the prompt generator providing the prompt to the large language model, wherein the prompt causes the large language model to operate on either the structured content and or summarized content according to the model instructions to produce output content;
   receiving the output content by a document formatter from the large language model, the document formatter producing a proposed document from the output content; and
   causing the proposed document to be displayed on a user interface of a device.

17. The non-transitory computer readable medium of claim 16, wherein the web scraper is programmed to:
   programmatically extract all links from the target site;
   perform a breadth first search of the links; and
   concatenate extracted text from the links based on the breadth first search.

18. The non-transitory computer readable medium of claim 17, wherein the target site is a website specified by a Uniform Resource Locator (URL), the web scraper to only extract links using a same domain as the URL and process HyperText Markup Language (HTML) from each link to extract all HTML tags that can contain text.

* * * * *